(12) United States Patent
Kunimatsu

(10) Patent No.: US 11,630,616 B2
(45) Date of Patent: Apr. 18, 2023

(54) INFORMATION PROCESSING APPARATUS, PRINTING METHOD, AND NON-TRANSITORY COMPUTER-READABLE MEDIUM STORING SUPPORT PROGRAM THEREFOR FOR CONTROLLING A PRINTER FOR PRINTING A BARCODE IMAGE

(71) Applicant: BROTHER KOGYO KABUSHIKI KAISHA, Nagoya (JP)

(72) Inventor: Akihiro Kunimatsu, Okazaki (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/485,812

(22) Filed: Sep. 27, 2021

(65) Prior Publication Data
US 2022/0011990 A1    Jan. 13, 2022

Related U.S. Application Data

(63) Continuation of application No. PCT/JP2020/006091, filed on Feb. 17, 2020.

(30) Foreign Application Priority Data

Mar. 28, 2019    (JP) .............................. JP2019-064057

(51) Int. Cl.
*G06F 3/12* (2006.01)
*H04N 1/32* (2006.01)

(52) U.S. Cl.
CPC .......... *G06F 3/1228* (2013.01); *G06F 3/1206* (2013.01); *H04N 1/32224* (2013.01)

(58) Field of Classification Search
CPC .. G06F 3/1228; G06F 3/1206; H04N 1/32224
(Continued)

(56) References Cited

U.S. PATENT DOCUMENTS

| 6,411,397 | B1 * | 6/2002 | Petteruti | G06K 15/00 358/1.14 |
| 2003/0048460 | A1 * | 3/2003 | Vinals-Matas | G06K 15/102 358/1.8 |

(Continued)

FOREIGN PATENT DOCUMENTS

| JP | 2008-80494 A | 4/2008 |
| JP | 2008-167314 A | 7/2008 |

(Continued)

OTHER PUBLICATIONS

International Preliminary Report on Patentability dated Oct. 7, 2021 issued in PCT/JP2020/006091 together with English translation.
(Continued)

*Primary Examiner* — Allen H Nguyen
(74) *Attorney, Agent, or Firm* — Scully, Scott, Murphy & Presser, PC

(57) ABSTRACT

According to aspects of the present disclosure, when a print instruction is input from an editing application to a general-use printing program, and image data included in the print instruction contains barcode information indicating a barcode, a support program corresponding to a printer generates
(Continued)

substitute image. The substitute image is generated by the general-use printing program and substitutes for an image of the barcode.

10 Claims, 7 Drawing Sheets

(58) Field of Classification Search
USPC .......................................................... 358/1.15
See application file for complete search history.

(56) References Cited

U.S. PATENT DOCUMENTS

| | | | | |
|---|---|---|---|---|
| 2005/0011958 | A1* | 1/2005 | Fukasawa | G06F 16/9554 |
| | | | | 235/462.46 |
| 2013/0083334 | A1* | 4/2013 | Kataoka | G06F 3/1247 |
| | | | | 358/1.2 |
| 2014/0049791 | A1* | 2/2014 | Nakamura | G06K 15/1836 |
| | | | | 358/1.13 |
| 2015/0077794 | A1* | 3/2015 | Ezoe | G06F 3/1244 |
| | | | | 358/1.15 |
| 2017/0223210 | A1 | 8/2017 | Yamada | |
| 2018/0143793 | A1 | 5/2018 | Kobayashi | |
| 2018/0253889 | A1 | 9/2018 | Nagasaka | |
| 2019/0050183 | A1 | 2/2019 | Inoue | |
| 2019/0266454 | A1* | 8/2019 | Ido | G06K 15/1843 |
| 2020/0034587 | A1 | 1/2020 | Isobe et al. | |

FOREIGN PATENT DOCUMENTS

| | | |
|---|---|---|
| JP | 2009-171500 A | 7/2009 |
| JP | 2012-194688 A | 10/2012 |
| JP | 2013-77102 A | 4/2013 |
| JP | 2013-167967 A | 8/2013 |
| JP | 2015-176532 A | 10/2015 |
| JP | 2017-134718 A | 8/2017 |
| JP | 2018-28817 A | 2/2018 |
| JP | 2018-84978 A | 5/2018 |
| JP | 2018-147259 A | 9/2018 |
| JP | 2019-148846 A | 9/2019 |
| JP | 2020-17085 A | 1/2020 |

OTHER PUBLICATIONS

International Search Report dated Mar. 24, 2020 issued in PCT/JP2020/006091 together with English translation.
Notice of Reasons for Refusal dated Nov. 1, 2022 received from the Japanese Patent Office in related JP 2019-064057 together with English language translation.
Notice of Reasons for Refusal dated Feb. 28, 2023 received from the Japanese Patent Office in related JP 2019-064057 together with English language translation.

* cited by examiner

<HEADDER INFORMATION>
  <PRINTER INFORMATION>
    PRINTER ID NUMBER: aaa
    MODEL: MODEL B
  <PRINT PARAMETER>
    SHEET SIZE
    SHEET TYPE: NORMAL
    COLOR/MONOCHROME: MONOCHROME
    IMAGE QUALITY: HIGH
} 201

<OBJECT INFORMATION>
  <TEXT INFORMATION>
    CONTENT: ABCDE
    FONT:
    POSITION:
  <BARCODE INFORMATION>
    CONTENT: 12345
    KIND:
    SIZE:
    POSITION:
} 202

<HEADDER INFORMATION>
  <PRINTER INFORMATION>
    PRINTER ID NUMBER: aaa
    MODEL: MODEL B
  <PRINT PARAMETER>
    SHEET SIZE
    SHEET TYPE: NORMAL
    COLOR/MONOCHROME: MONOCHROME
    IMAGE QUALITY: HIGH
} 201

<OBJECT INFORMATION>
  <TEXT INFORMATION>
    CONTENT: ABCDE
    FONT:
    POSITION:
} 202

<BARCODE INFORMATION>
  CONTENT: 12345
  KIND:
  SIZE:
  POSITION:
} 203

ABCDE

1 2 3 4 5

ABCDE
1 2 3 4 5

INFORMATION PROCESSING APPARATUS, PRINTING METHOD, AND NON-TRANSITORY COMPUTER-READABLE MEDIUM STORING SUPPORT PROGRAM THEREFOR FOR CONTROLLING A PRINTER FOR PRINTING A BARCODE IMAGE

CROSS-REFERENCE TO RELATED APPLICATIONS

This is a Continuation-in-Part of International Application No. PCT/JP2020/006091 filed on Feb. 17, 2020, which claims priority from Japanese Patent Application No. 2019-064057 filed on Mar. 28, 2019. The entire disclosures of the prior applications are incorporated herein by reference.

BACKGROUND

Technical Field

The present disclosures relate to a non-transitory computer-readable recording medium containing instructions which realize a support program for controlling a printer, an information processing apparatus, and a printing method adopted in such a printer.

Related Art

As technology for controlling a printer from an information processing apparatus such as a personal computer, there has been known a configuration in which a printer driver is installed in the information processing apparatus, print data is generated by the printer driver, and the thus generated print data is transmitted to the printer. The printer driver is typically provided by a manufacturer of the printer and is compatible with various printer functions, which enables the printer to be fully used.

SUMMARY

In recent years, technology to control printers using a general-use printing program that is built into an operating system (OS) as standard, without using the printer driver as mentioned above, has been put into practical use. According to such technology, when the OS detects a printer, the OS associates the printer with the OS-standard general-use printing program, and thereafter, when printing instructions to print images using that printer is received, printing can be performed by the OS-standard general-use printing program without using a printer driver.

However, the OS-standard general-use printing program and the printer driver provided by the printer manufacturer have different algorithms for generating print data. Therefore, an image containing a barcode can be correctly printed by the printer driver, but there is a possibility that the barcode image cannot be printed by the general-use printing program, or even though the general-use printing program can print the barcode image, it will not be of a quality that can be read by a barcode reader.

According to aspects of the present disclosure, there is provided a non-transitory computer-readable recording medium for an information processing apparatus configured to connect to a printer. A general-use printing program is incorporated in an operating system of the information processing apparatus. The recording medium containing computer-executable instructions realizing a support program corresponding to the printer. The instructions causes, when executed by a controller of the information processing apparatus, the information processing apparatus to perform, in response to a print instruction instructing the printer to print an image being made with respect to the general-use printing program, determining whether information indicating a barcode is included in image data representing the image subjected to print by the print instruction, and in response to determination that the information indicating the barcode is included in the image data in the determining, generating particular data causing the printer to print a substitute image substituting for the image of the barcode generable by the general-use printing program.

BRIEF DESCRIPTION OF THE DRAWINGS

FIGS. 5A and 5B show examples of a data structure of print job data.
FIGS. 6A-6C illustrate a procedure for generating composite image data.

DETAILED DESCRIPTION OF THE EMBODIMENTS

First Embodiment

Hereinafter, a printing system using a program according to a first embodiment will be described in detail with reference to the accompanying drawings. In the following description, embodiments of a printing system that includes a personal computer (hereinafter referred to as a "PC") and a printer will be described. The printing system according to each of the embodiment is used, for example, for printing barcodes.

Figure 1:
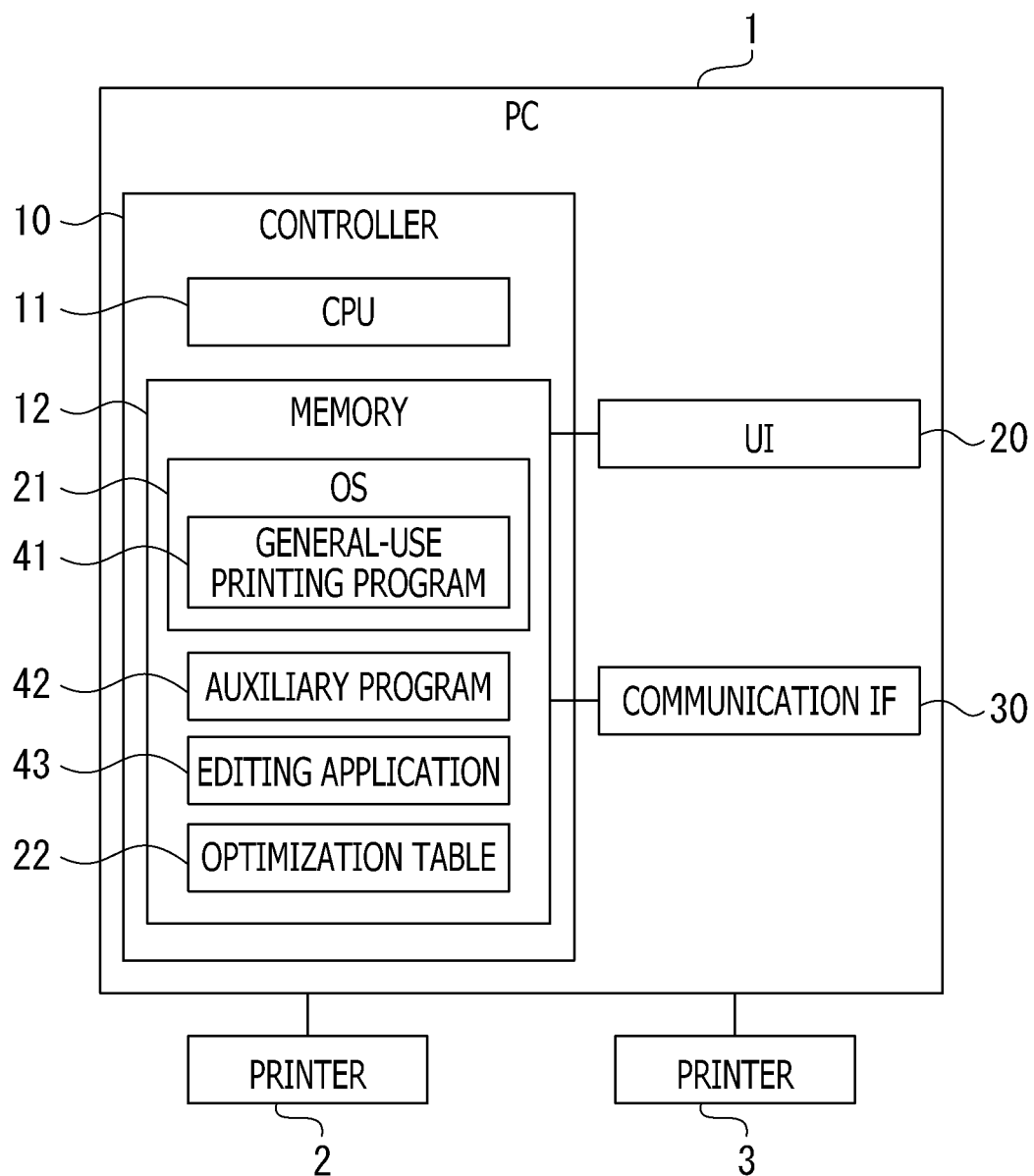
FIG. 1 is a block diagram of an electrical configuration of a printing system.

FIG. 1 shows an example of a printing system in which the program according to a first embodiment is executed. The system shown in FIG. 1 includes a PC 1, a printer 2, and a printer 3. The PC 1 is an example of an information processing apparatus. The printer 2 and the printer 3 are devices that have printing functions and can communicate with PC 1 via a local or network communication. It is noted that multiple printers 2 may be connected to the PC 1.

As shown in FIG. 1, the PC 1 is equipped with, for example, a controller 10, a user interface (hereinafter referred to as a "UI") 20, and a communication interface (hereinafter referred to as a "communication IF") 30. The UI 20 and the communication IF 30 are electrically connected to the controller 10.

The UI 20 includes hardware configured to display various types of information and receive user instruction input. The UI 20 may be a touch panel with both display and input receiving functions, or a combination of a display having the display function and a keyboard, a mouse and the like having the input receiving functions.

The communication IF 30 includes hardware configured to communicate with the printer 2 and the printer 3, and access the Internet. The communication IF 30 may include multiple interfaces with different communication methods.

For example, the communication methods include a network communication and a USB communication. Further, the communication methods may also be wired or wireless communication.

The controller 10 includes a CPU 11 and a memory 12. It is noted that the CPU 11 is an example of a computer. The memory 12 includes a ROM, a RAM, a non-volatile memory, and buffers for the CPU 11, and is configured to store programs such as various application programs (hereinafter referred to as "applications"), various data, and the like. It is noted that the details of the memory are not distinguished herein. The CPU 11 executes various processes in accordance with the program read from the memory 12 and based on the instructions of the user. The controller 10 in FIG. 1 is a generic term for the hardware and software used to control the PC 1, and does not necessarily represent a single piece of hardware that actually exists in the PC1.

An example of the memory 12 may be a computer-readable storage medium. A computer-readable storage medium is a non-transitory medium. The non-transitory mediums include a recording medium such as a CD-ROM, a DVD-ROM, and the like, in addition to the examples above. The non-transitory medium is also a tangible medium. On the other hand, an electrical signal carrying a program that is downloaded from a server on the Internet or the like is a computer-readable signal medium, which is a type of computer-readable medium, but is not included in the non-transitory computer-readable medium.

As shown in FIG. 1, the memory 12 stores, for example, an operating system (hereinafter referred to as an "OS") 21 including a general-use printing program 41, an auxiliary program 42, and an editing application 43. The auxiliary program 42 is an example of a support program. The auxiliary program 42 is, for example, a hardware support application (hereinafter, abbreviated as an "HSA") created by a printer vendor based on specifications published by Microsoft Corporation. The OS 21 is, for example, Microsoft Windows (registered trademark), macOS (registered trademark), or Linux (registered trademark). In addition to those shown in the drawings, various data including information on the connected printer and various programs such as a browser are stored in the memory 12. The memory 12 also stores various types of information, such as an optimization table 22.

The general-use printing program 41 is an application for causing, from the PC 1, various printers, such as the printer 2, to perform printing and is an OS standard printing program that is implemented, in advance, in the OS 21. The general-use printing program 41 in this embodiment is a program configured to generate print data that the printer can handle based on the image data to be printed.

The general-use printing program 41 is a general-purpose application applicable to any of multiple models of printers provided by the vendor of each printer, and is a program that causes each printer to perform operations common to the multiple models. Alternatively, the general-use printing program 41 may be a program provided by the vendor of each printer to the vendor of the OS 21 for incorporation in advance into the OS 21, for example, a type of printer driver provided to be implemented, in advance, into the OS 21.

The auxiliary program 42 is executed in association with the startup of the general-use printing program 41 and executes processing based on instructions from the OS 21. The auxiliary program is an application that supports control of the target hardware, such as the printer 2. The auxiliary program 42 is launched, for example, by the general-use printing program 41. The auxiliary program 42 is a program prepared by the vendor of the printer 2 for each type of printer. For example, an auxiliary program 42 for inkjet printers and an auxiliary program 42 for laser printers are prepared. Not only for each type of printer, the auxiliary programs 42 may be prepared for respective printer models or respective series of printer models.

The vendor of the printer registers the auxiliary program 42 to a platform provided by the vendor of the OS 21 according to a procedure specified by the vendor of the OS 21. When the printer 2 is newly connected to the PC 1 and the auxiliary program 42 corresponding to the printer 2 has been registered in the platform, the OS 21 downloads the auxiliary program 42 from the server where the auxiliary program 42 is stored and incorporates the downloaded auxiliary program 42 into the PC1.

Then, the OS 21 associates the identification information of the incorporated auxiliary program 42 with the printer information of the newly connected printer and stores the same in the memory 12. In a PC 1 to which multiple models of printers are connected, multiple auxiliary programs respectively corresponding to the models are incorporated, and multiple pieces of information respectively associating the printers with the auxiliary programs are stored in memory 12. In other words, as the printer information of each printer connected to the PC 1, the information of the corresponding auxiliary program 42 is stored in the memory 12 together with the model information and access information of the printer.

The editing application 43 is, for example, an application used for generating and editing image data and document data. The editing application 43 is, for example, Microsoft Word (registered trademark) or PowerPoint (registered trademark). The editing application 43 may also be an application provided by the vendor of the printer 2 or the printer 3. The editing application 43 receives user operations including instructions to cause the printer 2 to perform particular operations. Concretely, the editing application 43 receives, via the UI 20, for example, selection of an image subjected to be printed, setting of printing parameters, and printing instructions to cause the printer 2 to perform printing. The editing application 43 can receive, for example, an editing operation to edit an image including a barcode and text as a print target. The editing application 43 may also be configured to receive an editing operation to edit an image including a barcode font of the barcode.

A barcode has a barcode symbol and quiet zones. The barcode symbol indicates information with bars and spaces. The quiet zones are provided on the right, left, upper, and lower sides of the barcode symbol, each having a particular size. The barcode reader is configured to read the barcode based on a reflectance of the barcode. The spaces and the quiet zones of the barcode symbol may be a solid white area, or an area having a light background color with enough engineering reflectance which does not affect detection of the barcode.

When the general-use printing program 41 receives, for example, a print instruction with image data of an image containing a barcode and characters from the editing application 43, the general-use printing program 41 processes the image data to generate print data. However, for example, there is a case where the general-use printing program 41 indicates the bar portion of an image showing a barcode symbol (hereinafter referred to as the "barcode image") in grayscale. In addition, there is a case where the general-use printing program 41 generates print data that draws extra black dots in the spaces and the quiet zones of the barcode symbol.

Furthermore, even if the general-use printing program 41 accurately generates the print data for the barcode, the image quality of the barcode may deteriorate depending on the characteristics of the printer and the printing sheet. For example, image by inkjet printers are more likely to blot than thermal transfer printers, and when barcode bars are printed on a printing sheet by the inkjet printers, the blotting may cause the thickness of the bars to be thicker than the set value in the print data. Further, a plain sheet is more likely to blot than a glossy sheet, and when barcodes are printed on the plain sheet, the blotting may cause the thickness of the bars to be thicker than the set value of the print data.

Therefore, the auxiliary program 42 optimizes the image quality of the barcode image data indicating the barcode by improving the print data of the barcode generated by the general-use printing program 41 so that the printed barcode can be read correctly. The auxiliary program 42 corrects the print data, for example, by improving the print data with using an optimization table 22 stored in the memory 12. The optimization table 22 contains correction values when optimizing the print data. For example, the optimization table 22 contains model information, sheet type information, and thickness information which are associated with each other.

The thickness information is information indicating the correction value for correcting the thickness of the bars that constitute the barcode symbol. The smaller the correction value of the thickness information is, the thinner the bars are. The model information is the information indicating the model of the printer. When a printer of a model A is a thermal transfer printer and a printer of a model B is an inkjet printer, the thickness information of model B has, for example, a smaller correction value than the thickness information of model A. For example, when the thickness information of the model A is "±0," the thickness information of model B is set to "−1." In other words, even when the same barcode is printed on the same type of printing sheet, the printer of the model B draws the bars thinner than the printer of model A.

The sheet type information is information indicating the type of the printing sheet. For the same model B, the thickness information for the plain sheet has a smaller correction value than the thickness information for the glossy sheet. When, for example, the thickness information for glossy sheet of the model B is "−1," the thickness information for a plain sheet of the model B is "−2." In other words, even if the same model printer is used to print the same barcode, the bars on the plain sheet are drawn thinner than those on the glossy sheet.

It is noted that the processing and each processing step in the sequence diagram in the present embodiment basically indicate the processing of the CPU 11 according to the instructions described in programs such as the auxiliary program 42. In other words, "determination," "extraction," "selection," "calculation," "decision," "identification," "acquisition," "reception," "control," and the like in the following description represent processing performed by the CPU 11. The processing by the CPU 11 includes hardware control using an API of the OS 21. In this specification, the operation of each program is described with omitting detailed descriptions of the OS 21. In other words, in the following description, a statement that "a program B controls hardware C" may refer to "the program B controls the hardware C using the API of the OS 21." In addition, the processing of the CPU 11 according to the instructions described in the program may be described in abbreviated wording. For example, the program may be described in abbreviated form, such as "the CPU 11 performs." Also, the processing of the CPU 11 according to the instructions described in the program may be described in a phrase that omits the CPU, such as "the program A performs."

Note that "obtaining" is used in a concept that does not require a request. In other words, the process of receiving data without a request by the CPU 11 is also included in the concept of "obtaining" data by the CPU 11. Further, "data" in this specification is represented by a computer-readable bit string. Further, data with the same substantive meaning content but different formats will be treated as the same data. The same applies to "information" in this specification. In addition, "requesting" and "indicating" are concepts that indicate that information indicating what is being requested or indicated is to be output to the other party. The information indicating that it is being requested or instructed is also described simply as "requesting" or "indicating."

A process by which the CPU 11 determines whether information A indicates a matter B or not may be described conceptually as "determining whether it is the matter B or not from information A." Further, a process by which the CPU 11 determines whether information A indicates a matter B or a matter C may be conceptually described as "determining whether it is the matter B or the matter C from the information A."

Next, an example of a printing procedure including an operation of the auxiliary program 42 according to the present embodiment will be described with reference to a sequence diagram shown in FIG. 2. The auxiliary program 42 is a program that is instructed to be executed by the general-use printing program 41 when a printing instruction to print using the general-use printing program 41 is received via the editing application 43 or the like in a state where a printer corresponding to the auxiliary program 42 is designated. In the following description, a case where the PC 1 receives, via the UI 20 (e.g., the image data to be printed designated is designated in the editing application 43), an instruction to execute printing with the printer 2 via the general-use printing program 41, and where the auxiliary program 42 corresponding to the model type of the printer 2 is implemented in the PC 1 is explained.

First, the editing application 43 receives, via the UI 20, a designation of the image to be printed and an instruction input for executing printing (arrow A). An editing operation that instructs the editing application 43 to edit an image is an example of the designation of an image to be printed. An image edited by the editing application 43 according to the editing operation is an example of an image to be printed. The editing application 43 receives a print instruction that designates, for example, an image containing a barcode and characters as a print target image. It is noted that the editing application 43 may receive the barcode information indicating the barcode as an image or by means of a barcode font. After receiving the print instruction, the editing application 43 passes a print execution notification indicating the content of the received print instruction to the OS 21. In FIG. 2, operations of the OS 21 are omitted.

When the OS 21 receives a print execution notification using the general-use printing program 41, the OS 21 executes the general-use printing program 41 and passes the print execution notification to the general-use printing program 41 (arrow B). In the print execution notification, the general-use printing program 41 can receive various information, using the print instruction, such as information indicating the printer to be used for printing, information indicating the print parameters set in the application, information indicating the image data subjected to be printed, and information identifying the user who instructed printing. As described later, the information above can also be used by the auxiliary program 42.

The general-use printing program 41 generates intermediate image data by converting the format of the image data included in the print execution notification into the format of the intermediate image data, and generates print job data including the intermediate image data (arrow C). For example, the general-use printing program 41 processes the image data including barcode images or barcode fonts contained in the print execution notification into the intermediate image data. The image data contained in the editing application 43 can be of various types, and the general-use printing program 41 converts the received image data into intermediate image data suitable for generating the print data. If the image data included in the print execution notification is suitable for generating the print data, generating of the intermediate image data may be omitted and the image data included in the print execution notification may be used as it is, as the intermediate image data. The intermediate image data is, for example, XPS data.

Then, the general-use printing program 41 generates the print data based on the intermediate image data (arrow D). The print data is an example of the raster image data generated by the general-use printing program 41 based on the image data. The general-use printing program 41 generates the print data using general-purpose parameters among the print parameters. The print data generated by the general-use printing program 41 is print data in a format that can be used for printing on various printers. The print data is, for example, PWGRaster data or PDF data.

Since the auxiliary program 42 corresponding to the printer 2, which is the printer designated in the print instruction, is stored in the memory 12, the general-use printing program 41 outputs an execution command for the processing of the auxiliary program 42 and executes the auxiliary program 42 (arrow E). When, for example, the printer 2 is designated, the general-use printing program 41 identifies the model of the printer 2 based on the model information of the printer contained in the printer information stored in the memory 12, and starts the auxiliary program 42 corresponding to the model type. The execution command indicated by arrow E is accompanied by the print parameters and the print data.

The auxiliary program 42 obtains the print data by accepting an execution command from the general-use printing program 41 (arrow F). Arrow F shows an example of the acquisition process. The auxiliary program 42 analyzes the print data and searches for barcode image data indicating the barcode image (arrow G). In other words, the auxiliary program 42 determines whether the print job data contains the image data that has characteristics as a barcode. When, for example, the print data contains image data representing an image having a combination of lines of different thicknesses, such as a barcode symbol, the auxiliary program 42 detects the image data as the barcode image data (arrow H). Then, the auxiliary program 42 corrects the detected barcode image data (arrow I). Arrows G and H show examples of the determination process, and arrow I shows an example of the generation process.

At arrow I, the auxiliary program 42 determines, for example, whether the barcode image data contains image data indicating grayscale, that is, whether there is a grayscale image area. When it is determined that the barcode image data contains image data indicating the grayscale, the auxiliary program 42 may correct barcode image data by binarizing image data indicating the grayscale, that is, the grayscale image area.

Figure 3A:
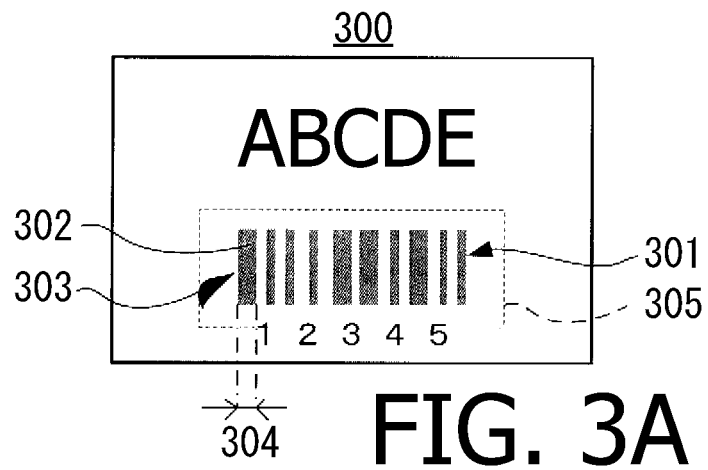
FIGS. 3A-3C show images that illustrate correcting of print data when an auxiliary program is used.
Figure 3B:
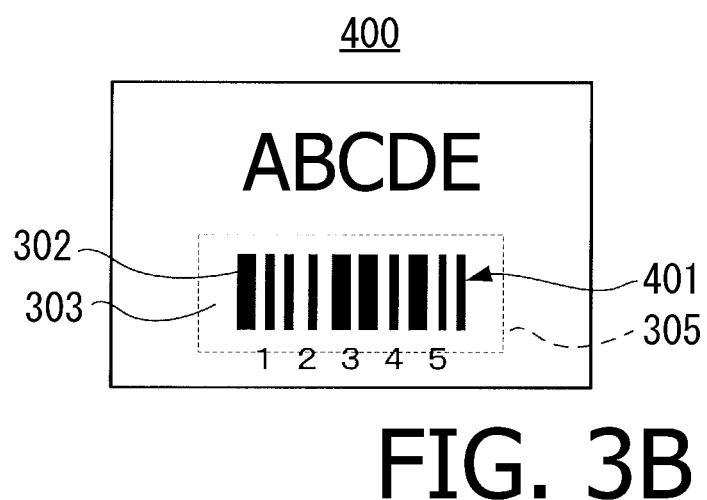

For example, as shown in FIG. 3A, if there is barcode image data 301 in print data 300 generated by the general-use printing program 41, the auxiliary program 42 determines whether a tone of the barcode image data 301 is white or black. When an area 302 of bars in the barcode image data 301 is represented in grayscale, the auxiliary program 42 corrects the barcode image data 301 by binarizing the area 302 represented in grayscale. FIG. 3B shows corrected print data 400 containing the thus corrected barcode image data 401. In the corrected barcode image data 401, the grayscale area 302 is changed to black. Therefore, the black area and the white area of the barcode are more clearly distinguished than in a case where the barcode image data is generated only by the general-use printing program 41. As a result, it is expected that the printer 2 will be able to form the bar portion of the barcode clearly, thereby outputting a barcode that can be read by a barcode reader.

Figure 2:
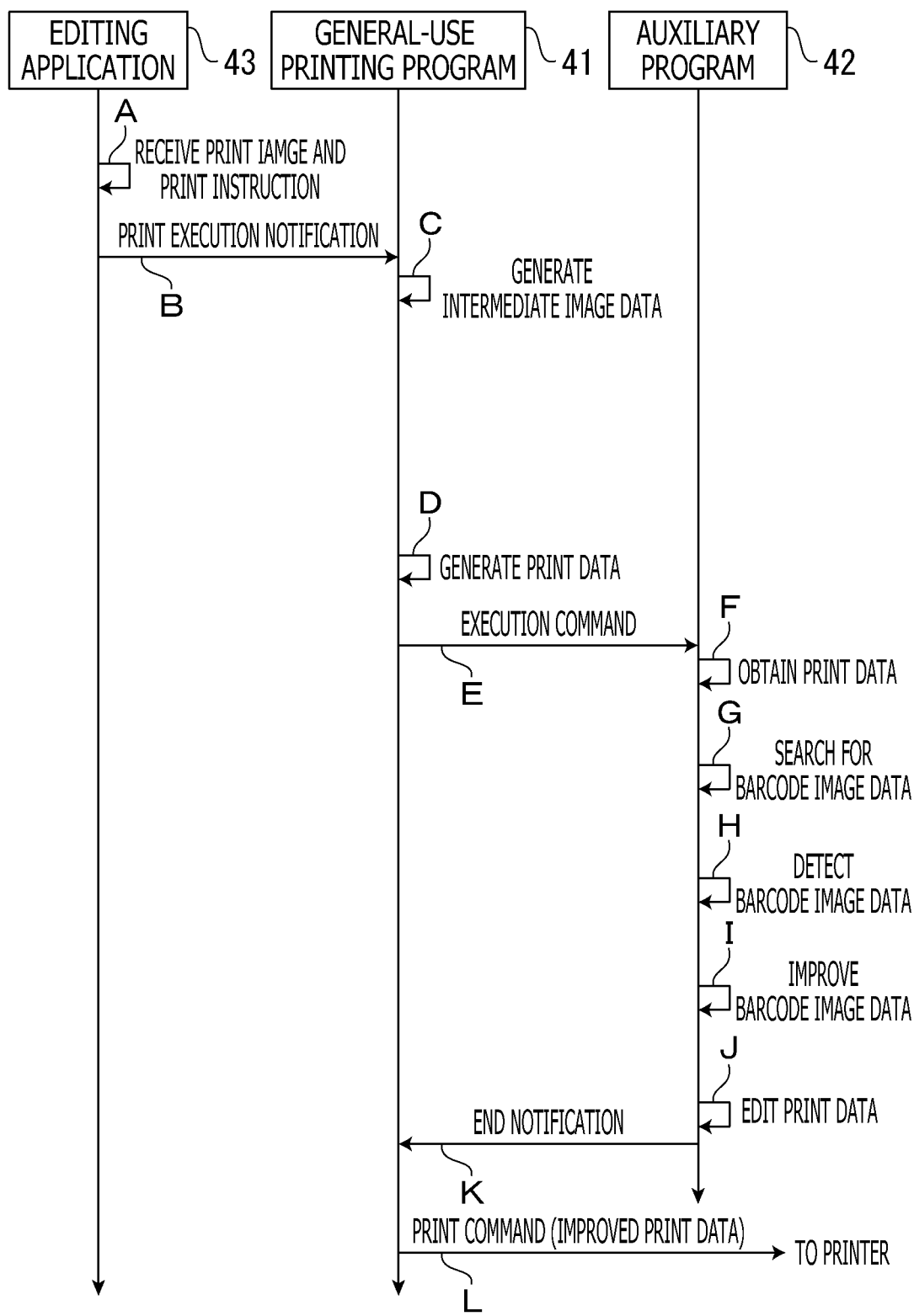
FIG. 2 is a sequence diagram showing an example of an order of operations by each program.

Alternatively or optionally, the auxiliary program 42 may correct the print data by providing a quiet zone of a particular size or larger, for example, in an area adjacent to the barcode image at the process in arrow I (see FIG. 2).

The auxiliary program 42 determines whether there is a white area 305 of a particular size or larger in the area adjacent to the barcode image in the print data 300 generated by the general-use printing program 41 (see FIG. 3A). For example, when there is a stain 303 in the white area 305 on the left side of the barcode image, the auxiliary program 42 paints out the stain 303 with white to secure the white area 305 of the particular size or larger on the left side of the barcode image. The color to paint out the stain 303 is not necessarily limited to white, but can also be a light color with a suitable optical reflectivity that does not affect the detection of the barcode.

Figure 3C:
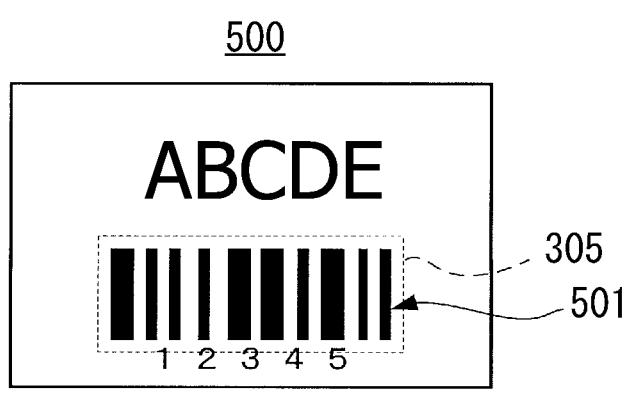

When the white area 305 adjacent to the barcode image is not larger than the particular size in print data 500 (see FIG. 3C) generated by the general-use printing program 41, the barcode image data 501 may be reduced so that the white area 305 provided on the left, right, up and bottom sides of the barcode image data 501 may be enlarged relatively to have the particular size or larger. In such a case, the auxiliary program 42 determines a reduction rate based on a barcode algorithm so that the barcode reader can distinguish between bars and spaces. Such painting out and reducing processes ensure that the quiet zones of the particular size or larger are provided on the left, right, up, and down sides of the barcode symbol, increasing a possibility that the barcode reader can recognize the barcode.

The auxiliary program 42 may also correct the barcode image data at the process of arrow I (see FIG. 2), for example, by processing the barcode symbol into a suitable image based on the optimization table 22 so that the barcode symbol becomes suitable for being read. It is noted that processing the barcode symbol into the image suitable for the barcode reader to read the barcode is an example of correcting of the barcode symbol to optimize the same.

When, for example, the model of the printer 2 is "Model B" and the sheet type of the print parameter is "plain sheet," the auxiliary program 42 reads the thickness information "−2" associated with "Model B" and "plain sheet" from the optimization table 22. For example, the auxiliary program 42 processes the thickness 304 of the bar shown in FIG. 3A to be thinner according to the thickness information read from the optimization table 22. As a result, the image data of the bar portion will reflect the effect of the blotting.

Accordingly, when the printer 2 prints the barcode on the plain sheet, the thickness of the bars will be substantially equal to the thickness specified by the print data, thereby the barcode drawing quality being expected to be corrected.

In the above-described example, the thickness information was identified based on the model and the paper type. However, the thickness information may be identified based on either the model or the paper type. In the present embodiment, the barcode symbol is processed into an image so that the barcodes become suitable for being read by the barcode reader by reducing the thickness of the bar, that is, the width of the bar. Alternatively or optionally, the barcode symbol can be processed into an image so that the barcodes become suitable for being read by the barcode reader by increasing the size of the highly reflective area of which color is white or the like. The corrected barcode image data is an example of a substitute image, and the print data including the corrected barcode image data is an example of specific data. At the process in arrow I (see FIG. 2), all of the various corrections described above may be performed, or the user may be able to select the corrections, and the corrections may be performed according to the selection.

After correcting the barcode image data, the auxiliary program 42 edits part of the print data other than the barcode image data based on the print parameters (arrow J in FIG. 2). For example, at arrow J, the auxiliary program 42 adds commands for executing functions intrinsic to the printer 2 to the print data. When the auxiliary program 42 cannot detect the part of the barcode image data to be corrected, or when the barcode image data is not included in the print data, the auxiliary program 42 may perform the processing of arrow J without performing the processing of arrow I. It is noted that the processed print data that includes the corrected barcode image data is an example of particular data.

Then, the auxiliary program 42 reflects the print data after processing to the print job, returns an end notification indicating the end of the processing to the general-use printing program 41, and terminates the process (arrow K). The auxiliary program 42 may reflect the print data after processing to the print job via the general-use printing program 41 by providing the print data after processing to the general-use printing program 41.

In response to receiving the end notification from the auxiliary program 42, the general-use printing program 41 transmits the print command to the printer 2 (arrow L). Then, the printer 2 that receives the print command executes printing of the image represented by the print data according to the print data attached to the print command. When the printer 2 receives the print data to which the commands are appended, the printer 2 performs the operations indicated by the commands in executing the printing. The auxiliary program 42 may transmit the print command to the printer 2 via the communication IF 30 without via the general-use printing program 41. In such a case, the auxiliary program 42 may convert the print data into a data format different from the aforementioned data format and transmit the same to the printer 2.

As explained above, when the image to be printed contains a barcode image of a barcode, the auxiliary program 42 provided by the printer manufacturer corrects the print data generated by the general-use printing program 41 for printing the barcode image as necessary. As a result, compared to a case where the barcode image is printed as is by the general-use printing program 41, print data with higher barcode drawing accuracy can be output to the printer 2. In other words, the printer 2 can be expected to print barcodes with a drawing accuracy sufficient for being read by the barcode reader, compared to the case where the barcode image is printed as is by the general-use printing program 41.

Second Embodiment

Next, a printing system using a program according to a second embodiment will be described with reference to the drawings. In the following description, the symbols same as those in the first embodiment are used in the drawings for a configuration and processing common to the first embodiment, and the description thereof will be omitted as appropriate.

The editing application 43 may pass the barcode font of the barcode, instead of the image data containing the barcode, to the general-use printing program 41 with the print execution notification. Since barcode printing is a special function, there could be a case where the general-use printing program 41 cannot analyze the barcode font to generate intermediate image data or print data. Therefore, according to the present embodiment, the auxiliary program 42 corresponding to the printer 2 is configured to have a function to generate the raster image data of the barcode based on the barcode font of the barcode.

Figure 4:
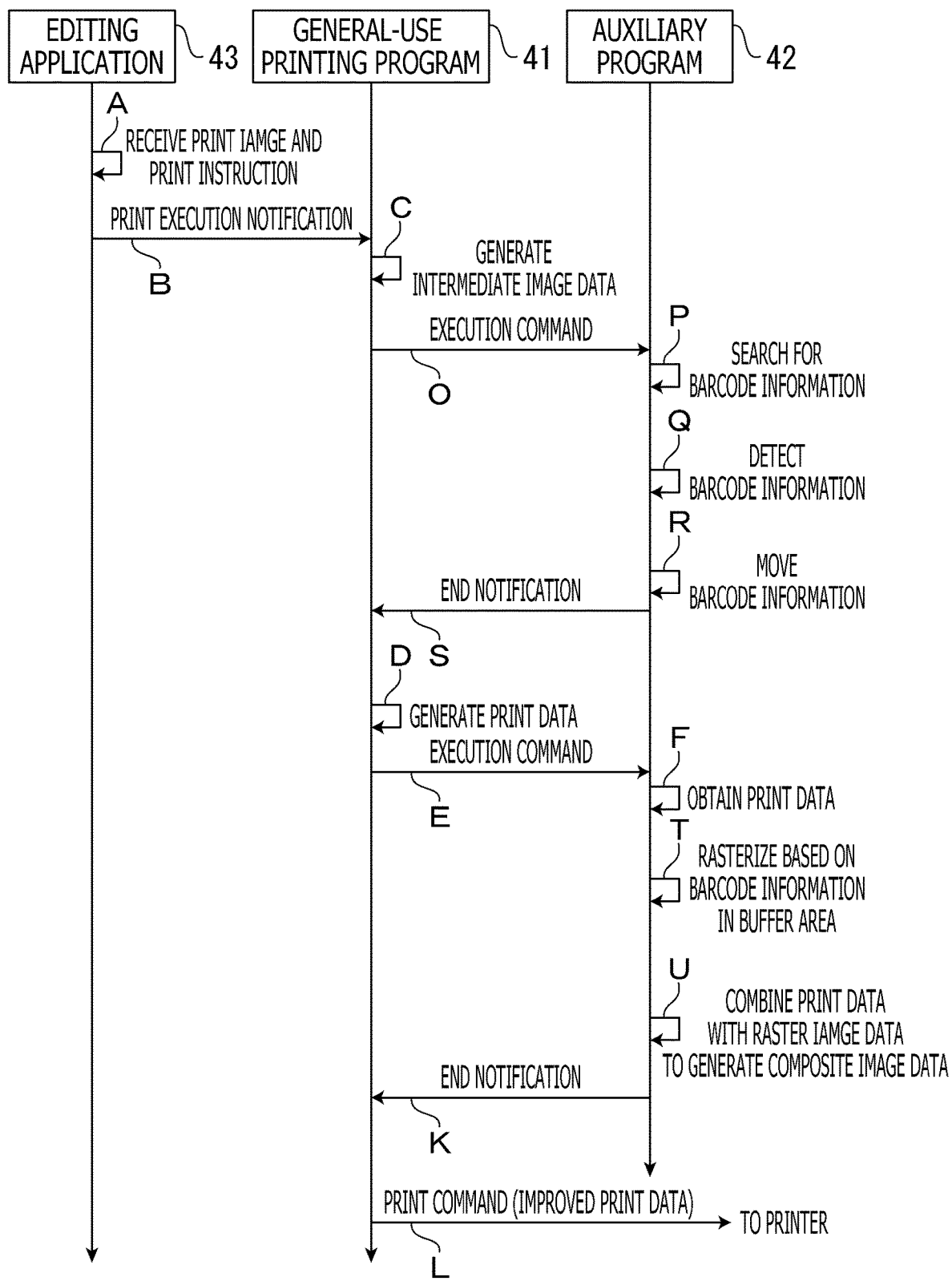
FIG. 4 is a sequence diagram.

An example of the printing procedure including the operation of the auxiliary program 42 according to the second embodiment will be described with reference to the sequence diagram shown in FIG. 4. It is noted that, in FIG. 4, the operation of the OS 21 is omitted as in FIG. 2. In FIG. 4, an example in which the editing application 43 designates an image containing a barcode and characters, and causes the printer 2 to print the image via the general-use printing program 41 will be described.

First, the editing application 43 receives, via the UI 20, the designation of an image subjected to printing and the instruction input for print execution (arrow A in FIG. 4), and outputs a print execution notification (arrow B in FIG. 4). For example, when the editing application 43 receives an image containing a barcode font as a print target, the editing application 43 adds the image data containing the barcode font to the print execution notification.

The general-use printing program 41 generates intermediate image data by converting the format of the image data contained in the print execution notification into the format of intermediate image data, and generates print job data containing the intermediate image data (arrow C).

For example, the general-use printing program 41 generates the print job data 200 as shown in FIG. 5A. The print job data 200 has various storage areas, including a header area 201, an object area 202, and a buffer area 203.

The header area 201 is an area to store settings received by the editing application 43. In the header area 201, for example, printer information such as printer identification information and model is stored. The general-use printing program 41 identifies the printer designated as the device to be caused to perform printing based on the information contained in the print execution notification, and the information of the identified printer is stored as the printer information. When the printer 2 is designated, for example, the general-use printing program 41 identifies the model of printer 2 based on the model information of the printer included in the printer information stored in the memory 12, and stores the model in the header area 201. In addition, print parameters such as the sheet size, the sheet type, the color/monochrome, and the image quality added to the print execution instruction are stored in the header area 201.

The object area 202 is an area configured to store object information indicating the object to be drawn. In other words, the intermediate image data generated by the general-use printing program 41 is stored in the object area 202 in an XPS format. For example, in a case where a user operation of selecting an image containing a barcode font and a character string as a print target is performed, the text information of the character string "ABODE," that is, a text content, a text font, size, and a position of the text, are stored in the object area 202. In addition, the barcode information of the barcode, i.e., the barcode font "12345," type, size, and position are stored in the object area 202. The buffer area 203 is a temporary storage area used when various processes are executed.

The general-use printing program 41 outputs the execution command after generating the print job data 200 (arrow O). In other words, in response to detection of the print execution notification, the general-use printing program 41 outputs the execution instruction to the auxiliary program 42 before generating the print data. This execution command is accompanied by the printing parameters and the intermediate image data containing the barcode fonts. Upon receiving the execution command from the general-use printing program 41, the auxiliary program 42 searches for barcode information from the intermediate image data (arrow P). For example, the auxiliary program 42 determines whether there is a barcode font in the object area 202 of the print job data.

When, for example, the auxiliary program 42 receives the print job data shown in FIG. 5A, the auxiliary program 42 detects the barcode font "12345" (arrow Q). In other words, the auxiliary program 42 determines that the intermediate image data contains barcode information indicating a barcode. Processing indicated by arrows P and Q are examples of a determining process. A case where the barcode information is detected is an example of a case where there is object information indicating a barcode in the image data of the print job data.

In the above case, the auxiliary program 42 moves the barcode information from the object area 202 to the buffer area 203 (arrow R), as shown in FIG. 5B. In other words, the auxiliary program 42 overwrites the detected barcode information into the buffer area 203 and deletes the barcode information from the object area 202. The processing of arrow R is an example of a barcode storing process, and the barcode information stored in the buffer area 203 is an example of barcode object data. As a result, a mode of the print job data is changed.

After that, the auxiliary program 42 returns the end notification indicating the end of the process to the general-use printing program 41 and terminates the process (arrow S), as shown in FIG. 4.

In response to the end notification, the general-use printing program 41 generates print data based on the intermediate image data stored in the object area 202 (arrow D). In other words, the intermediate image data with the barcode image omitted is rasterized to generate the print data. The general-use printing program 41 generates print data using the general-use parameters among the print parameters. Concretely, for example, as shown in FIG. 6A, the general-use printing program 41 rasterizes the data of the image showing characters to generate the raster image data 310. The raster image data 310 generated by the general-use printing program 41 is an example of the raster image data generated by the general-use printing program based on the object information contained in the image data included in the print job data.

As shown in FIG. 4, after generating the print data, the general-use printing program 41 outputs an execution command that causes the process of the auxiliary program 42 to be executed (arrow E). The auxiliary program 42 obtains the print data by receiving the execution command from the general-use printing program 41 (arrow F). Processing of arrow F is an example of the obtaining process. The auxiliary program 42 performs rasterization based on the barcode information stored in the buffer area 203, and generates the raster image data of the barcode (arrow T).

Concretely, for example, the auxiliary program 42 generates raster image data 320 of the barcode image indicating a barcode, as shown in FIG. 6B. The raster image data 320 is generated in the same data format as the print data obtained from the general-use printing program 41. Processing of arrow T is an example of a raster process.

The auxiliary program 42 combines the raster image data of the barcode generated by the processing of arrow T with the print data generated by the general-use printing program 41 based on the intermediate image data stored in the object area 202 to generate the composite image data (arrow U). Concretely, the auxiliary program 42 combines, for example, the raster image data 310 shown in FIG. 6A with the raster image data 320 shown in FIG. 6B to generate the composite image data 330 shown in FIG. 6C. The processing of arrow U is an example of the generation process, and the composite image data 330 is an example of specific data.

Then, the auxiliary program 42 returns the end notification to the general-use printing program 41 and terminates the process (arrow K). The general-use printing program 41 transmits the print command to the printer 2 in response to receiving the end notification from the auxiliary program 42 (arrow L). At this time, the print command is accompanied by the composite image data 330. The printer 2 draws the composite image data 330 in accordance with the print command and prints the image containing the barcode and characters on the printing sheet.

When the barcode font cannot be detected at arrow Q, the printing process is performed without the auxiliary program 42 executing the above processing at arrows R, T, and U.

As described above, when the image to be printed contains a barcode font indicating a barcode, the auxiliary program 42 generates raster image data 320 of a barcode image indicating the barcode from the barcode font "12345" stored in the buffer area 203 (arrow T, FIG. 6B). The auxiliary program 42 generates the composite image data 330 by combining the raster image data 310 (FIG. 6A) generated by the general-use printing program 41 with the raster image data 320 (FIG. 6B) generated by the auxiliary program 42 (arrow U, FIG. 6C). Thus, even when the general-use printing program 41 is unable to generate raster image data of barcodes from barcode fonts, the printer 2 can draw barcode images. In particular, since the auxiliary program 42 corresponding to the printer 2 generates the composite image data 330, the barcode drawing accuracy can be expected to be corrected.

In addition, the auxiliary program 42 moves the barcode information from the object area 202 to the buffer area 203 at arrow R, reducing the amount of object information stored in the object area 202. Therefore, the amount of processing that the general-use printing program 41 rasterizes at arrow D can be reduced.

All of the object information stored in the object area 202 may be moved to the buffer area 203. In such a case, the auxiliary program 42 will rasterize, for example, the entire image including characters and barcodes at arrow T. According to the above configuration, since there is no object information in the object area 202, the amount of processing to be rasterized by the general-use printing program 41 can be reduced at arrow D.

It is also not necessary to delete the barcode information from the object area 202 at arrow R. In this case, the raster image data generated at arrow U may be overwritten with the data stored in the object area 202, thereby changing the mode of the print job data.

Third Embodiment

Next, a printing system using a program according to a third embodiment will be described with reference to the drawings. In the following description, configurations and processes that are common to the first embodiment are indicated with the same reference numerals/symbols as in the first embodiment in the drawings, and explanations are omitted as appropriate.

The third embodiment differs from the first embodiment above in that, when a print instruction is transmitted from the editing application 43 to the general-use printing program 41, the auxiliary program 42 rasterizes the image data attached to the print instruction to generate print data and transmits the same to the printer 2. In other words, the general-use printing program 41 does not generate or transmit the print data, which is different from the first embodiment.

Figure 7:
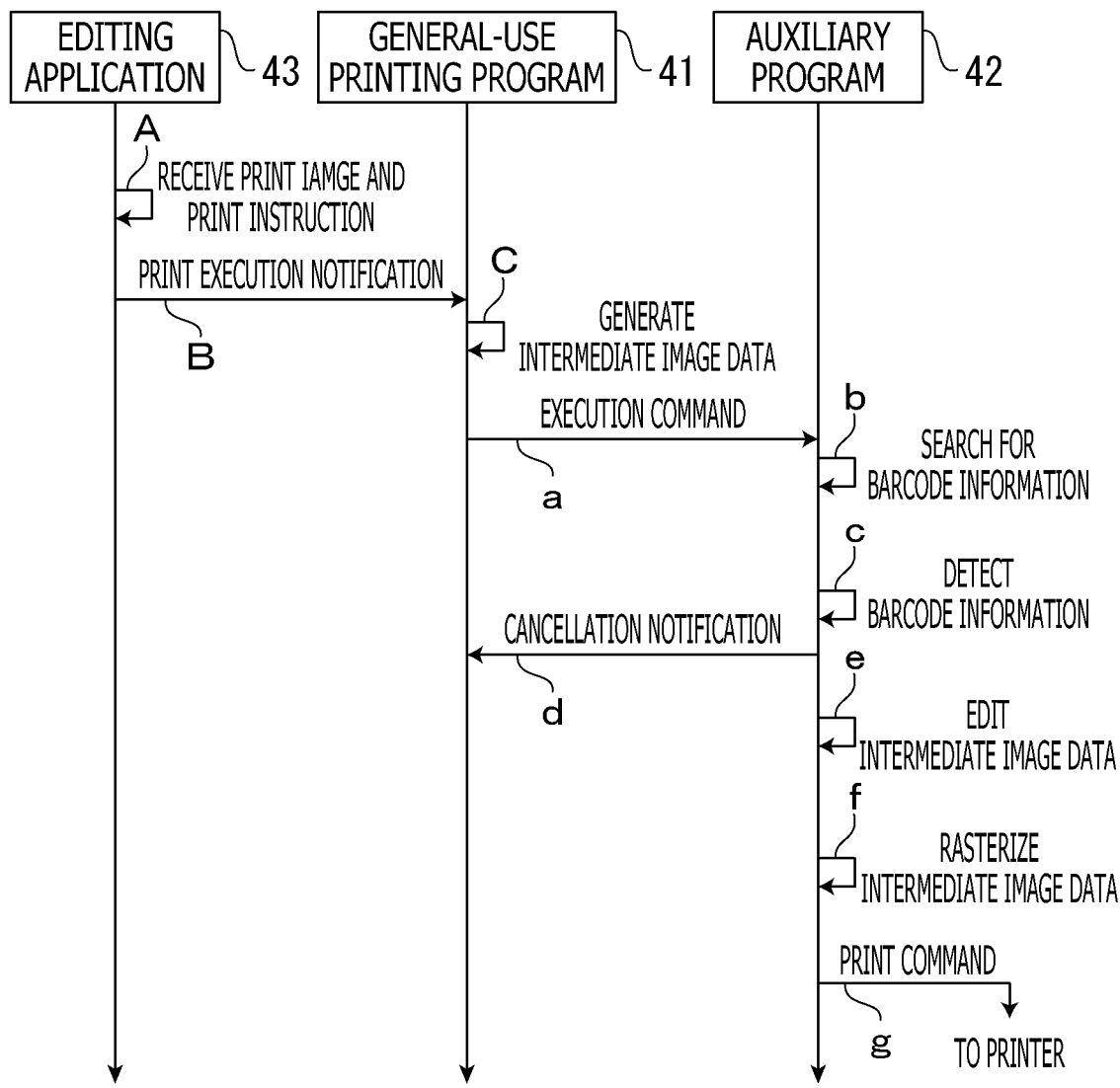
FIG. 7 is a sequence diagram.

An example of the printing procedure including the operation of the auxiliary program 42 according to the third embodiment will be described with reference to a sequence diagram shown in FIG. 7. In FIG. 7, the operation of the OS 21 is omitted as in the first embodiment. In the following description, an example is given in which the editing application 43 designates an image containing a barcode and characters and causes the printer 2 to print the image via the general-use printing program 41.

When the auxiliary program 42 receives the execution command output from the general-use printing program 41 and obtains the print job data (arrow a), the auxiliary program 42 searches for barcode information (arrow b). In other words, the auxiliary program 42 determines whether the intermediate image data stored in the print job data contains barcode information. It is noted that the intermediate image data is an example of object information. The barcode information can be a barcode image or a barcode font.

When detecting the barcode information (arrow c), the auxiliary program 42 outputs a cancellation notification to the general-use printing program 41 (arrow d). When receiving the cancellation notification, the general-use printing program 41 will no longer be involved in the processing of the print job. The processing at arrows b and c are examples of a determining process, and the processing at arrow d is an example of a cancellation process.

The auxiliary program 42 that has output the cancellation notification edits the intermediate image data (arrow e) and generates print data by rasterizing the processed intermediate image data (arrow f). When the processing of arrow e is not performed, the auxiliary program 42 generates the print data by rasterizing the intermediate image data obtained from the general-use printing program 41. In other words, the raster image data of the entire image, including the barcode image of the barcode, is generated. The processing of arrow f is an example of the generation process, and print data is an example of specific data.

Then, the auxiliary program 42 transmits the print data generated by the processing at arrow f to the printer 2 using the communication IF 30 (arrow g). The processing of arrow g is an example of the transmission process. The printer 2 executes printing of the image containing the barcode according to the print data.

When the barcode information is not included in the intermediate image data and the barcode information cannot be detected (arrow c), the auxiliary program 42 does not have to output the cancellation notification of the processing at arrow d. In this case, the general-use printing program 41 generates print data based on the intermediate image data and transmits the generated print data to the printer 2. In other words, the auxiliary program 42 does not have to execute the processing at arrows f and g.

As described above, when the intermediate image data generated by the general-use printing program 41 includes the barcode information, the auxiliary program 42 corresponding to the printer 2 generates the raster image data of the entire image including the barcode (arrow f) and transmits the print data to the printer 2 (arrow g). In other words, the general-use printing program 41 is not involved in the generation or transmission of the print data. Therefore, the auxiliary program 42 can generate and output print data to the printer 2 with a higher barcode drawing accuracy than when the general-use printing program 41 generates print data containing barcode images. Thus, it becomes possible to cause the printer 2 to print barcodes that can be read by the barcode reader.

Fourth Embodiment

Next, the printing system using a program according to a fourth embodiment will be described with reference to the drawings. In the following description, the same signs/reference numerals as those of the third embodiment are used in the drawings for the configurations and processing in common with the third embodiment, and the description thereof will be omitted as appropriate. The fourth embodiment differs from the third embodiment in that the printer 2 has a function for generating barcodes as a unique function, and the auxiliary program 42 generates commands instead of generating print data and transmits the commands to the printer 2.

Figure 8:
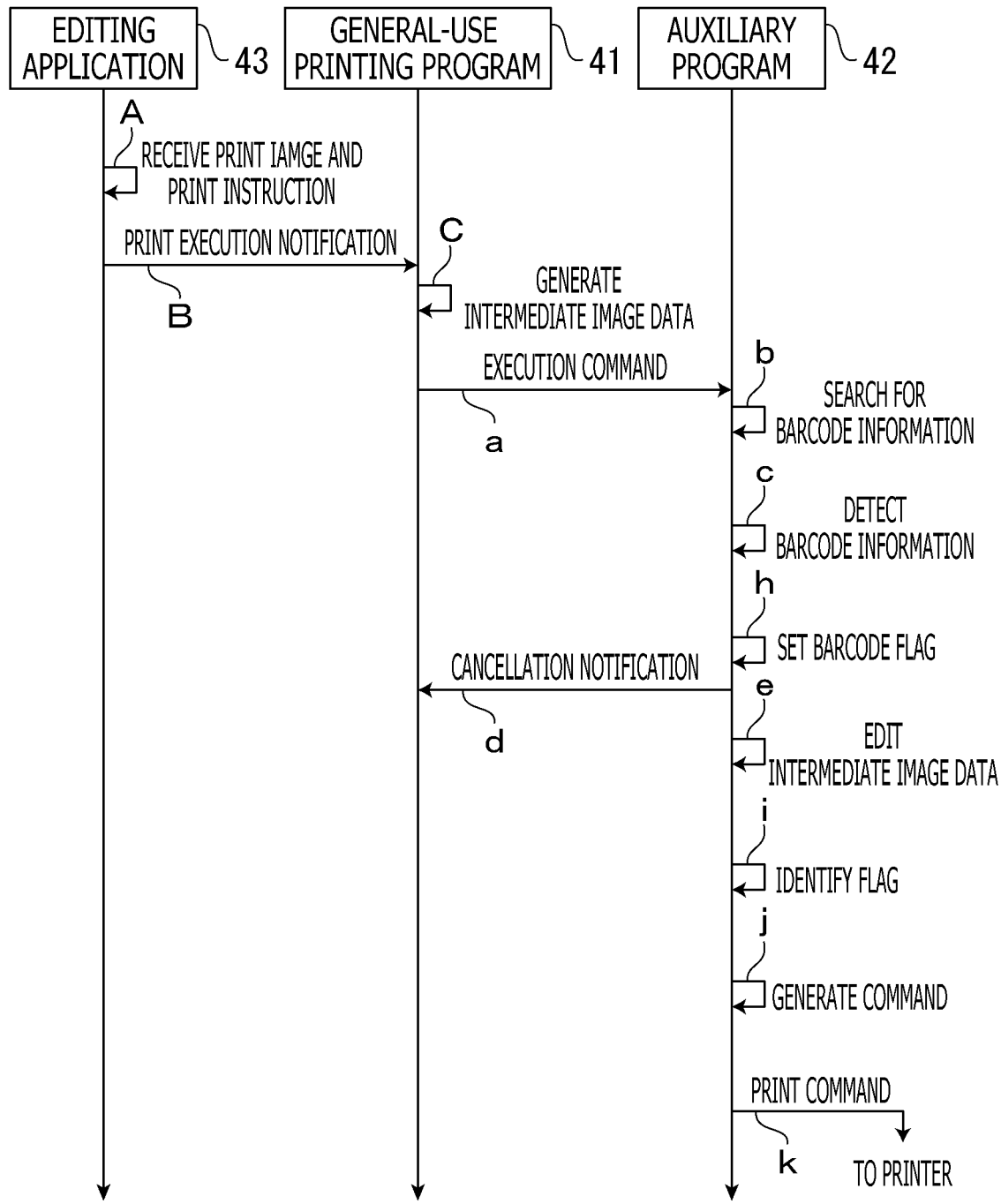
FIG. 8 is a sequence diagram.

As shown in a sequence diagram shown in FIG. 8, when detecting the barcode information (arrow c), that is, when it is determined that the intermediate image data generated by the general-use printing program 41 contains barcode information, the auxiliary program 42 sets a flag in the intermediate image data (arrow h). Then, the auxiliary program 42 outputs a cancellation notification (arrow d) and performs an intermediate image data editing process (arrow e). Incidentally, the order of the processing of arrows h and the processing of arrows d may be reversed.

The auxiliary program 42 determines whether a flag is set in the intermediate image data processed by the processing at arrow e (arrow i), and when it is determined that a flag is set, the auxiliary program 42 generates a command based on the intermediate image data and print parameters (arrow j). Then, the auxiliary program 42 transmits the generated command to the printer 2 using the communication IF 30 (arrow k). The printer 2 draws the image, which is subjected to printing, including the barcode and characters, according to the command.

In a case where the barcode information is not included in the intermediate image data and the barcode information cannot be detected (arrow b), the auxiliary program 42 may not perform the outputting of the cancellation notification at arrow d, but may have the general-use printing program 41 generate print data based on the intermediate image data and transmit the print data. In other words, the auxiliary program 42 may not have to execute the processing of arrows h, i through k.

As described above, when the intermediate image data generated by the general-use printing program 41 includes barcode information, the auxiliary program 42 corresponding to the printer 2 generates a command to rasterize the entire image including the barcode (arrow j) and transmits the command to the printer 2 (arrow k). In other words, the general-use printing program 41 is not involved in generating and sending the print data. Since the printer 2 draws images to be printed, including barcodes and characters, according to the commands generated by auxiliary program 42 corresponding to printer 2, the accuracy of drawing barcodes is higher than when printing is performed after receiving print commands from general-use printing program 41. That is, it becomes possible to cause the printer 2 to print the barcodes that can be read by a barcode reader.

The embodiments described above merely examples and do not limit aspects of the present disclosures in any way. Therefore, aspects of the present disclosures can naturally be corrected or modified in various ways within the aspects of the present disclosures. For example, the device connected to the PC1 is not necessarily limited to the printer, but can be a multifunctional peripheral, a copier, a facsimile machine, or any other device having a printing function. Further, the number of printers connected to PC 1 is not necessarily limited to number in the example shown in the drawings, but can be one or more than two. The information to be stored in the object information may be one or more than two pieces.

the processing of arrow T shown in FIG. 4 may represent a process to generate a command to rasterize an image containing a barcode based on the barcode information stored in the buffer area 203. In such a case, the processing at arrow U may add the command to the print data generated by the general-use printing program 41. The general-use printing program 41 transmits the print data with this command added to the printer 2, and the printer 2 generates and draws the barcode image based on the command According to the above configuration, since the printer 2 is made to draw barcodes, it becomes possible to cause the printer 2 to output barcode images with high drawing accuracy.

In the above-described embodiment, the correction of the barcode image by the auxiliary program 42 is described with reference to FIGS. 2 and 4. It should be noted that the auxiliary program 42 may also be configured to perform other processes such as editing of intermediate image data and printing data other than the correction of the barcode image.

In addition, in any sequence diagram as disclosed, a plurality of processes in any plurality of steps can be arbitrarily changed in the order of execution or executed in parallel, to the extent that there is no contradiction in the processing contents.

The processing disclosed in the embodiments may be executed by a single CPU, multiple CPUs, hardware such as an ASIC, or a combination thereof. In addition, the processing disclosed in the embodiments may be realized in various forms, such as a non-transitory recording medium in which a program for executing the processing is recorded, or a method.

What is claimed is:

1. A non-transitory computer-readable recording medium for an information processing apparatus configured to connect to a printer, a general-use printing program being incorporated in an operating system of the information processing apparatus, the recording medium containing computer-executable instructions realizing a support program corresponding to the printer, the instructions causing, when executed by a controller of the information processing apparatus, the information processing apparatus to perform:

in response to a print instruction instructing the printer to print an image being made with respect to the general-use printing program, determining whether information indicating a barcode is included in image data representing the image subjected to print by the print instruction, the image data containing one or more pieces of object information indicating one or more objects subjected to be drawn, respectively;

in response to determining that the information indicating the barcode is included in the image data, generating particular data causing the printer to print a substitute image substituting for the image of the barcode generable by the general-use printing program;

wherein in the determining, print job data containing the image data is obtained from the general-use printing program, and when the obtained print job data includes the object information indicating the barcode, it is determined that the obtained job data includes information indicating the barcode, wherein the instructions further cause the information processing apparatus to perform, when it is determined in the determining that the obtained job data includes the information indicating the barcode, cancelling processing of the image data by the general-use printing program, and wherein in the generating, the particular data is generated based on the object information included in the image data of the print job data.

2. The recording medium according to claim 1, wherein in the generating, raster image data including the barcode image is generated as the particular data based on the object information contained in the image data of the print job data; and wherein the instructions further cause the information processing apparatus to perform transmitting the particular data generated in the generating to the printer.

3. A non-transitory computer-readable recording medium for an information processing apparatus configured to connect to a printer, a general-use printing program being incorporated in an operating system of the information processing apparatus, the recording medium containing computer-executable instructions realizing a support program corresponding to the printer, the instructions causing, when executed by a controller of the information processing apparatus, the information processing apparatus to perform:

in response to a print instruction instructing the printer to print an image being made with respect to the general-use printing program, determining whether information indicating a barcode is included in image data representing the image subjected to print by the print instruction, the image data containing one or more pieces of object information indicating one or more object subjected to printing, respectively;

in response to determining that the information indicating the barcode is included in the image data, generating particular data causing the printer to print a substitute image substituting for the image of the barcode generable by the general-use printing program;

wherein the image data includes one or more pieces of object information indicating one or more object subjected to printing, respectively, wherein in the determining, when print job data including the image data is obtained from the general-use printing program and the image data of the obtained print job data includes the object information indicating the barcode, it is determined that information indicating the barcode is included;

wherein the instructions further cause the information processing apparatus to perform, when it is determined that the information indicating the barcode is included in the determining, storing, in a mode different from a mode of storing the image data, barcode object data corresponding to the object information indicating the barcode in the print job data; and wherein in the generating, generating, based on the barcode object data, the particular data causing the printer to print a combined image, the combined image being an image in which an image represented by raster image data generated by the general-use printing program based on the object information included in the image data of the print job data and an image indicated by the barcode object data are combined.

4. The recording medium according to claim 3, wherein in the storing of the barcode object data, after storing the barcode object data in the print job data in a mode different from a mode of storing the image data, deleting the barcode object data from the image data.

5. The recording medium according to claim 4, wherein all of object information in the image data is the barcode object data in the storing of the barcode object data.

6. The recording medium according to claim 3, wherein the instructions further cause the information processing apparatus to perform:

raster process of, based on the barcode object data, obtaining raster image data of the barcode; and wherein in the generating, combined raster image data is generated as the particular data, the combined raster image data being image data in which raster image data generated by the general-use printing program based on the object information included in the image data of the print job data and the raster image data generated based on the barcode object data are combined.

7. The recording medium according to claim 3, wherein in the generating, a command causing the printer to draw an image represented by the object information included in the barcode object data is generated, and the particular data is generated by adding the command to the raster image data generated by the general-use printing program, wherein the general-use printing program transmits the generated particular data generating to the printer, and wherein the printer has a function of drawing an image based on the command.

8. A non-transitory computer-readable recording medium for an information processing apparatus configured to connect to a printer, a general-use printing program being incorporated in an operating system of the information processing apparatus, the recording medium containing computer-executable instructions realizing a support program corresponding to the printer, the instructions causing, when executed by a controller of the information processing apparatus, the information processing apparatus to perform:

in response to a print instruction instructing the printer to print an image being made with respect to the general-use printing program, determining whether information indicating a barcode is included in image data representing the image subjected to print by the print instruction, the image data containing one or more pieces of object information indicating one or more objects subjected to be drawn, respectively;

in response to determining that the information indicating the barcode is included in the image data, generating particular data causing the printer to print a substitute image substituting for the image of the barcode generable by the general-use printing program;

wherein in the determining, print job data containing the image data is obtained from the general-use printing program, and when the obtained print job data includes the object information indicating the barcode, it is determined that the obtained job data includes information indicating the barcode, wherein the instructions further cause the information processing apparatus to perform, when it is determined in the determining that the obtained job data includes the information indicating the barcode, cancelling processing of the image data by the general-use printing program, wherein in the generating, the particular data is generated based on the object information included in the image data of the print job data;

wherein in the generating, the print job data including the image data is obtained from the general-use printing program, and a command causing the printer to draw an image corresponding to the object information is generated in the particular data based on the object information contained in the image data; and wherein the instructions further cause the information processing apparatus to perform transmitting the particular data generated in the generating to the printer, the printer having a function of drawing the image based on the command.

9. An information processing apparatus, comprising:

a storage storing an operating system of the information processing apparatus, a general-use printing program being incorporated in the operating system;

a controller, wherein a support program corresponding to a printer to be connected to the information processing apparatus is implemented in the information processing apparatus, wherein the controller is configured to execute the support program to perform:

in response to a print instruction instructing the general-use printing program to cause the printer to print an image being made, determining whether information indicating a barcode is included in image data representing the image subjected to print by the print instruction, the image data containing one or more pieces of object information indicating one or more objects subjected to be drawn, respectively;

in response to determining that the information indicating the barcode is included in the image data, generating particular data causing the printer to print a substitute image substituting for the image of the barcode generable by the general-use printing program;

wherein in the determining, print job data containing the image data is obtained from the general-use printing program, and when the obtained print job data includes the object information indicating the barcode, it is determined that the obtained job data includes information indicating the barcode, wherein the instructions further cause the information processing apparatus to perform, when it is determined in the determining that the obtained job data includes the information indicating the barcode, cancelling processing of the image data by the general-use printing program, and wherein in the generating, the particular data is generated based on the object information included in the image data of the print job data.

10. A printing method for an information processing apparatus having a storage storing an operating system of the information processing apparatus, a general-use printing program being incorporated in the operating system, and a support program corresponding to a printer to be connected to the information processing apparatus being implemented in the information processing apparatus, wherein the method comprising:

in response to a print instruction instructing the general-use printing program to cause the printer to print an image being made, determining whether information indicating a barcode is included in image data representing the image subjected to print by the print instruction, the image data containing one or more pieces of object information indicating one or more objects subjected to be drawn, respectively;

in response to determining that the information indicating the barcode is included in the image data, generating particular data causing the printer to print a substitute image substituting for the image of the barcode generable by the general-use printing program;

wherein in the determining, print job data containing the image data is obtained from the general-use printing program, and when the obtained print job data includes the object information indicating the barcode, it is determined that the obtained job data includes information indicating the barcode, wherein the instructions further cause the information processing apparatus to perform, when it is determined in the determining that the obtained job data includes the information indicating the barcode, cancelling processing of the image data by the general-use printing program, and wherein in the generating, the particular data is generated based on the object information included in the image data of the print job data.

* * * * *

UNITED STATES PATENT AND TRADEMARK OFFICE
CERTIFICATE OF CORRECTION

PATENT NO. : 11,630,616 B2
APPLICATION NO. : 17/485812
DATED : April 18, 2023
INVENTOR(S) : Akihiro Kunimatsu It is certified that error appears in the above-identified patent and that said Letters Patent is hereby corrected as shown below:

In the Claims

Column 16, Claim 3, Line 61 should read:
object information indicating one or more objects sub- Column 17, Claim 3, Lines 1-3 should be deleted Column 17, Claim 3, Line 18 should read:
code object data, the particular data causes the printer Signed and Sealed this
Fourteenth Day of November, 2023

Katherine Kelly Vidal
*Director of the United States Patent and Trademark Office*